United States Patent
Do et al.

(10) Patent No.: US 7,796,572 B2
(45) Date of Patent: Sep. 14, 2010

(54) VIRTUAL DEVICE

(75) Inventors: Thanh Van Do, Oslo (NO); Tore Erling Jonvik, Oslo (NO); Paal Engelstad, Snaroya (NO); Thuan Van Do, Oslo (NO)

(73) Assignee: Telenor ASA, Fornebu (NO)

( * ) Notice: Subject to any disclaimer, the term of this patent is extended or adjusted under 35 U.S.C. 154(b) by 862 days.

(21) Appl. No.: 10/555,044

(22) PCT Filed: Apr. 29, 2004

(86) PCT No.: PCT/NO2004/000123

§ 371 (c)(1),
(2), (4) Date: Oct. 28, 2005

(87) PCT Pub. No.: WO2004/098123

PCT Pub. Date: Nov. 11, 2004

(65) Prior Publication Data

US 2006/0291433 A1 Dec. 28, 2006

(30) Foreign Application Priority Data

Apr. 29, 2003 (NO) .................................. 20031931

(51) Int. Cl.
*H04W 4/00* (2009.01)

(52) U.S. Cl. .................... 370/338; 370/320; 370/351; 370/352; 370/401; 455/41.2; 455/552.1; 455/419; 455/420; 455/556.2

(58) Field of Classification Search ......... 455/418–420, 455/425, 550.1, 41.2, 3.06, 41.3, 552.1, 553.1, 455/556.1, 556.2, 557; 370/254, 338, 400, 370/401, 335, 342, 328, 352, 431, 320, 351; 709/201–205, 208, 209, 217–221, 227–232
See application file for complete search history.

(56) References Cited

U.S. PATENT DOCUMENTS

| | | | |
|---|---|---|---|
| 6,285,889 B1 * | 9/2001 | Nykanen et al. | 455/557 |
| 6,842,460 B1 * | 1/2005 | Olkkonen et al. | 370/465 |
| 6,888,811 B2 * | 5/2005 | Eaton et al. | 370/338 |
| 6,909,721 B2 * | 6/2005 | Ekberg et al. | 370/401 |
| 7,039,033 B2 * | 5/2006 | Haller et al. | 370/338 |
| 7,346,369 B2 * | 3/2008 | Fitton et al. | 455/553.1 |
| 7,415,270 B2 * | 8/2008 | Wilhelmsson et al. | 455/419 |
| 2002/0169886 A1 * | 11/2002 | Saito et al. | 709/230 |
| 2003/0026213 A1 | 2/2003 | Frank et al. | 370/254 |
| 2003/0078002 A1 * | 4/2003 | Sanjeev et al. | 455/41 |
| 2003/0078062 A1 * | 4/2003 | Burr | 455/502 |

* cited by examiner

*Primary Examiner*—Charles N Appiah
*Assistant Examiner*—Olumide T Ajibade Akonai
(74) *Attorney, Agent, or Firm*—Schneck & Schneck; Thomas Schneck

(57) ABSTRACT

A Virtual Device is described which is composed of at least one Open device, e.g. a PDA, laptop or mobile phone that can be programmed, at least one Closed device, e.g. a camcorder or digital camera with a closed inner structure, and a number of Primitive devices, e.g. a head-set or microphone. A middleware installed on one or more Open Devices or on an external server will act as an operation system getting the devices to cooperate as one Virtual Device.

50 Claims, 10 Drawing Sheets

VIRTUAL DEVICE

TECHNICAL FIELD

This invention relates to mobile communication systems and mobile data services in general and in particular a Virtual Device for use in such systems.

TECHNICAL BACKGROUND

Although mobile and portable devices are getting more and more advanced and incorporating more functions, it is foreseen that in the future a user will make use of more and more devices such as mobile phone, PDA (Personal Digital Assistant), headset, microphone, digital camera, digital camcorder, etc. The user will have to manage all of them and it is not always an easy task even for technicians. It would be nice if the user can consider all the independent devices as one big "Virtual Device" having multiple input and output units and providing a coherent and surround interface to the user [1], [2].

Commonly a number of add-on units are available for the users of mobile devices (cellular telephones and PDAs), like head-sets, web cameras, external keyboards, printers, etc. These units can be connected to the mobile device through e.g. a cable, an infrared link or a Bluetooth® link. However, the mobile device must be designed for handling these particular external units, and comprise the necessary interfaces and software solutions.

An expansion of this concept is disclosed in Norwegian patent application no. 1998 5563 to Aktiebolaget LM Ericsson, now abandoned. This application describes a component-based terminal, in which the main component (a processing unit for a mobile telephone) is carried by the user, and in which secondary components; head-sets, display units, etc., either can be carried on the users body, or be available in the near environment. Thus, the terminal is broken up into many separate functional elements. This means that the resultant terminal can include external facilities like a large stationary display screen, a full size keyboard or a printer that are available in the room where the user is situated at the moment (e.g. in his office); the terminal being configured on-the-fly in order to add in any components that are available. The configuration is controlled by software agents for each individual external unit; the agents being contained in the main component. However, the application does not furnish any more information on how the components interact or how the terminal is configured. The setup is locked to the features which are supported by hardware and software in the main component.

From F. Louagie, L. Munoz, S. Kyriazakos, "Paving the Way for the Fourth Generation: A New Family og Wireless Personal Area Networks", IEEE 56th Vehicular Technology Conference, Vancouver, Canada, September 2002, there is known a wireless personal network comprising a master unit controlling a number of primitive add-on units. This is an elaborate version of the personal network; in principle known from mobile phones with add-on units like microphones and headphones.

European Patent Application EP 1282282 A2 describes a personal network in which the JINI service is used to detect applications installed on the units forming the network. However, the JINI service cannot discover and add hardware components to a network; it is only able to recognize applications or services.

BRIEF SUMMARY OF THE INVENTION

It is an object of the present invention to provide a Virtual Device that combine the abilities and resources of several independent devices possessed by the user, like mobile phones, PDAs, etc., by which the user does not have to purchase the resource twice and hence can save money.

Another object of the invention is to provide a Virtual Device in which the individual devices share resources like processing power, battery power, memory, data, applications, network access points and user-interfaces.

Still another object is to provide a Virtual Device in which the user stores his setup preferences in a user profile avoiding having to enter his preferences in each individual device.

The objects above are solved in a Virtual Device according to the present invention as claimed in the appended patent claims.

In particular, according to a first aspect, the invention relates to a Virtual Device composed of a multitude of stationary and/or portable electronic devices, of which at least one of the devices is a first Open Device with an available inner structure and a network interface, at least one Primitive Device arranged to communicate with other Devices and act as a pure slave to said devices, said Virtual Device further including at least one Closed Device with a closed inner structure and a network interface, said open and closed devices being connected in a Personal Area Network, a Personal Area Network middleware being installed in said first Open Device, said first Open Device being arranged to act as a Personal Area Network controller.

According to a second aspect, the invention relates to a Virtual Device composed of a multitude of stationary and/or portable electronic devices, including an Open Devices with an available inner structure and a network interface, at least one Primitive Device arranged to communicate with other devices and act as a pure slave to said devices, which is characterized in at least one additional Open Device, at least one Closed Device with a closed inner structure and a network interface, said open and closed devices being connected in a Personal Area Network, a Personal Area Network middleware being installed on said Open Devices, said Personal Area Network Middleware being distributed between said Open Devices, said Open Devices being arranged to act as a Personal Area Network controller.

According to a third aspect, the invention relates to a Virtual Device composed of a multitude of portable electronic devices, including an Open Device with an available inner structure and a network interface, at least one Primitive Device arranged to communicate with other devices and act as a pure slave to said devices, which is characterized in at least one Closed Device with a closed inner structure and a network interface, said at least one Closed Device being equipped with a network interface connected to an external network which includes a Personal Area Network server, a Personal Area Network middleware being installed on said server, said open and closed devices and said server forming a Personal Area Network operated by said Personal Area Network middleware.

According to a fourth aspect, the invention relates to a Virtual Device composed of a multitude of stationary and/or portable electronic devices, which includes a Closed Device with a closed inner structure and a network interface connected to an external network, at least one Primitive Device arranged to communicate with said Closed Device or devices and act as a pure slave to said device or devices, a server in said external network on which is installed a system and network management software, said server being arranged to communicate with said Closed Device or devices in order to act as a Personal Area Network controller.

BRIEF DESCRIPTION OF THE DRAWINGS

The invention will now be described in reference to the appended drawings, in which.

DETAILED DESCRIPTION OF THE INVENTION

With the emergence of local short-range communication technologies such as Bluetooth [3], WLAN [4], HiperLAN, etc. local connectivity between devices is enabled. The devices belonging to a person will form a private Personal Area Network (PAN) where devices appear and disappear dynamically. However, most importantly, connectivity does not necessarily mean communication and many challenging issues must be resolved before devices can collaborate and together form a Virtual Device. This invention proposes and describes a PAN middleware that enables the formation of a Virtual Device on the PAN and that is capable of handling the dynamical presence of devices and the diversity of device types.

This invention can be realized in at least four different embodiments:
1. An architecture and the necessary middleware functions to realize a Virtual Device based on an isolated PAN (Personal Area Network) with a unique open device
2. An architecture and the necessary middleware functions to realize a Virtual Device based on an isolated PAN with multiple open devices.
3. An architecture and the necessary middleware functions to realize a Virtual Device based on networked without open device
4. An architecture and the necessary middleware functions to realize a Virtual Device based on networked with open device In order to realize the Virtual Device, the PAN and his devices must be hidden to the user and his applications and this is done by introducing a PAN middleware.

Figure 1:
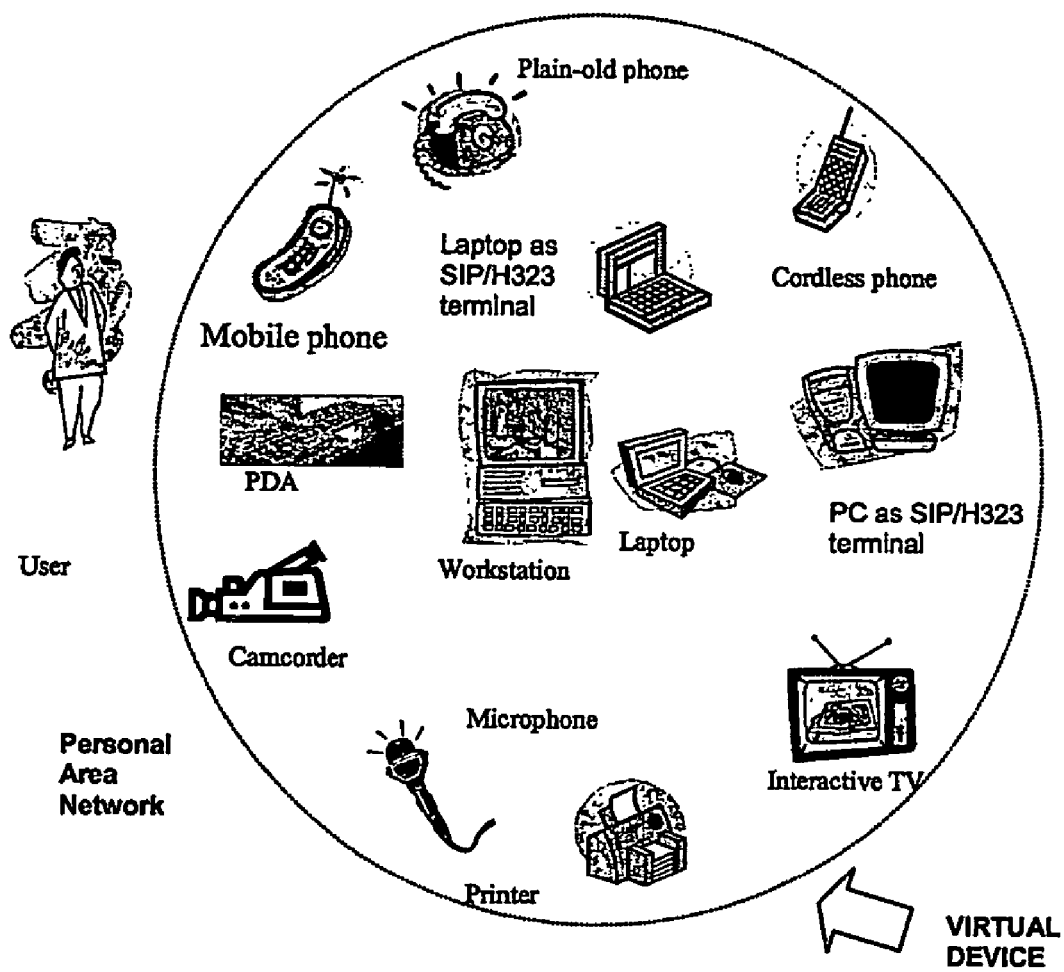
FIG. 1 is an overview showing devices that might be included in a Virtual Device in a Personal Area Network according to the present invention.
Figure 2:
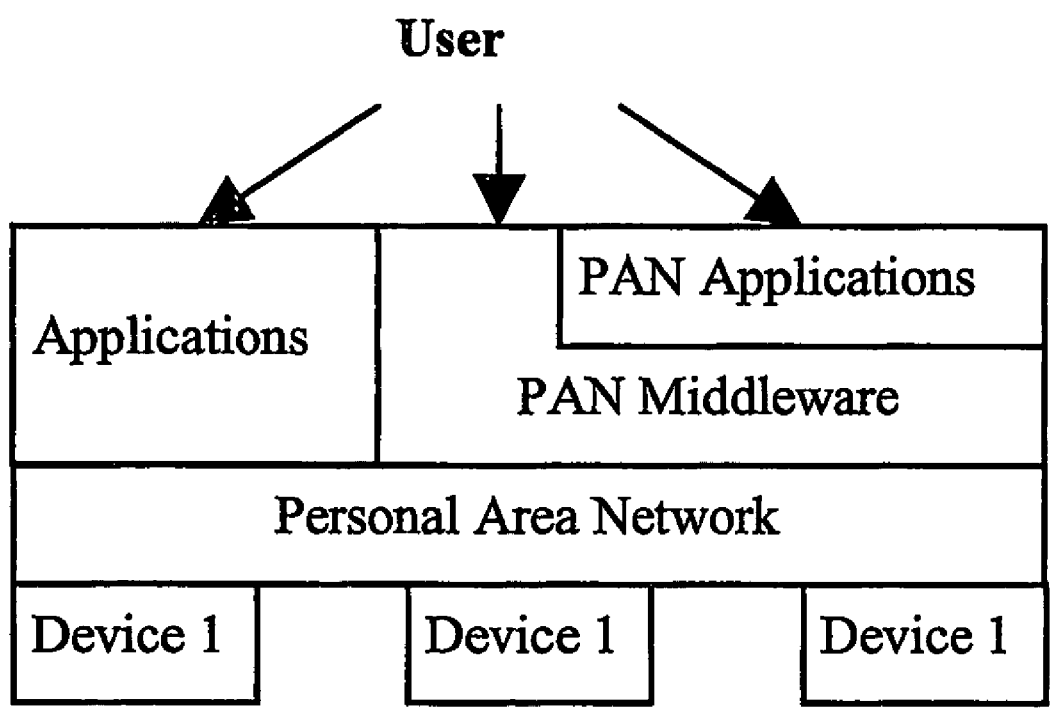
FIG. 2 is a schematic diagram showing the overall architecture of a Personal Area Network.

As shown in FIG. 2 the PAN middleware must be capable of handling not only the Personal Area Network but also the heterogeneity and the dynamic of devices. There are precisely these two characteristics that make the PAN middleware different from the traditional Distributed Computing Middleware where the computing nodes are supposed to be stable and equal or at least having the minimum of capabilities e.g. processing, storage, communication, etc.

Indeed, on the PAN there are a variety of devices such as:
Communications devices (fixed, mobile &IP phones)
Computing devices (Computer, PC, laptop, PDA, etc.)
Peripheral devices (Printer, scanner, digital camera, camcorder, etc.)
Electronic devices (TV, stereo equipment, loudspeakers, etc.)
Electronic appliances (fridge, espresso machine, washing machine, etc.)

The devices can be:
On-body or Off Body
Mobile or stationary
With or without Network connections
With or without local wireless connections It will be necessary to differentiate the device types as follows:
Primitive device: Simple devices that cannot operate alone but are slave to other devices, e.g. earphone, microphone, display, etc.
open device: Devices allowing the installation and execution of PAN Middleware and other applications, e.g. PDA, laptop, workstation, etc.
Closed device: Devices that can operate stand-alone but are like a black box i.e. its internal structure and functions are totally hidden and communicate with the environment though only well defined interfaces. For instance, a digital camera is advanced device having processor, memory, input and output units but does not allow the installation and execution of foreign applications. It communicates with the rest of the word via interfaces like serial, parallel, USB, etc.

Figure 3:
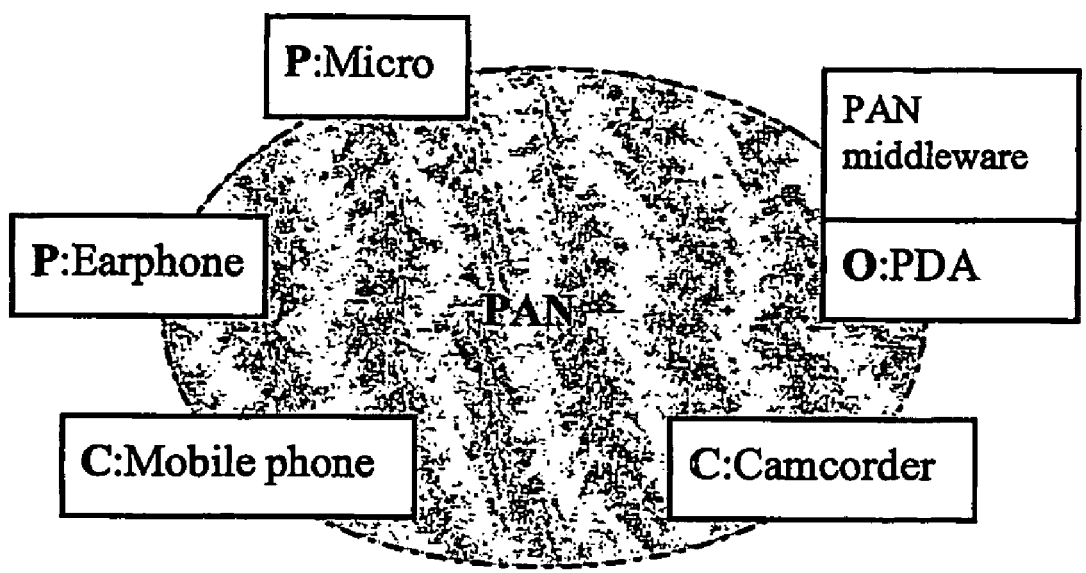
FIG. 3 is a diagram showing a Virtual Device on a PAN with a unique Open Device.

Let us now successively consider the following four solutions as follows:
Virtual Device on isolated PAN with unique Open device
Virtual Device on Isolated PAN with multiple Open devices
Virtual Device on Networked PAN without Open device
Virtual Device on Networked PAN with Open device Virtual Device on Isolated Pan with Unique Open Device In this PAN configuration, there is no device having connection with any wired or wireless network. There is only one Open device while the rest is either Primitive or Closed. FIG. 3 shows a Virtual Device on a PAN with two primitive devices: microphone and earphone, two Closed devices: Mobile phone and Camcorder, and one Open device: PDA.

In such a PAN it is desirable to achieve the following:
All the open and Closed devices should have the ability to use the Primitive ones i.e. the mobile phone, the camcorder and the PDA should be able to share the microphone and the earphone. It is worth noting that today, such a device sharing is not supported with Bluetooth.
The Open devices should have the ability to use Closed devices. This is possible although very dependent on the interfaces offered by the Closed device. For example, the PDA can only communicate with the mobile phone using the AT command [5] to make e.g. a call request.
The Closed devices can only user other Open or Closed devices if they are programmed for that.

A PAN middleware is necessary to achieve the resource sharing as above. In this case the PAN middleware is located on the PDA since it is the unique device capable of accommodating the PAN Middleware (PANM).

Let us now define the necessary capabilities and functions for this configuration.

A. Device Profile

The PANM should be able to detect and to recognize what are the devices present in the PAN, what type they are and what capabilities they have or what service they are offering, e.g. printing, sound input, text displaying, etc. The PANM must have the mechanism to handle the device profiles containing device type and capabilities and to do the comparison with detected devices. The definition of device types must be logical and unambiguous definition of device types. It must be logical to address both composite devices and inherited devices. It must be unambiguous to guarantee the identification of a device type. Ideally, the definition of device types should be standardized.

B. Resource Discovery and Updating

The Resource Discovery comprises both the Device and Service Discovery. To support the PAN's dynamic where devices appear and disappear, the PANM should be equipped with mechanisms for Device Discovery and Updating. One alternative is to carry out polling periodically. Since Primitive devices may be tied to their master and not visible to other, the PANM should also ask also Open and Closed devices for Primitive devices connected to the device. In a second alternative, the PANM only run the device discovery once and relies on triggering from the network layer to update its device set. In a third alternative, the changes are only updated when an attempt to reach a device upon request from an application fails.

The PANM should also store the present devices. It is hence necessary to have a naming convention, e.g. PDA 1, Mobile 2, etc. The network addresses (IP, Blutetooth, etc.) and protocols for each device must also be saved.

C. Device Input and Output redirection

Figure 4:
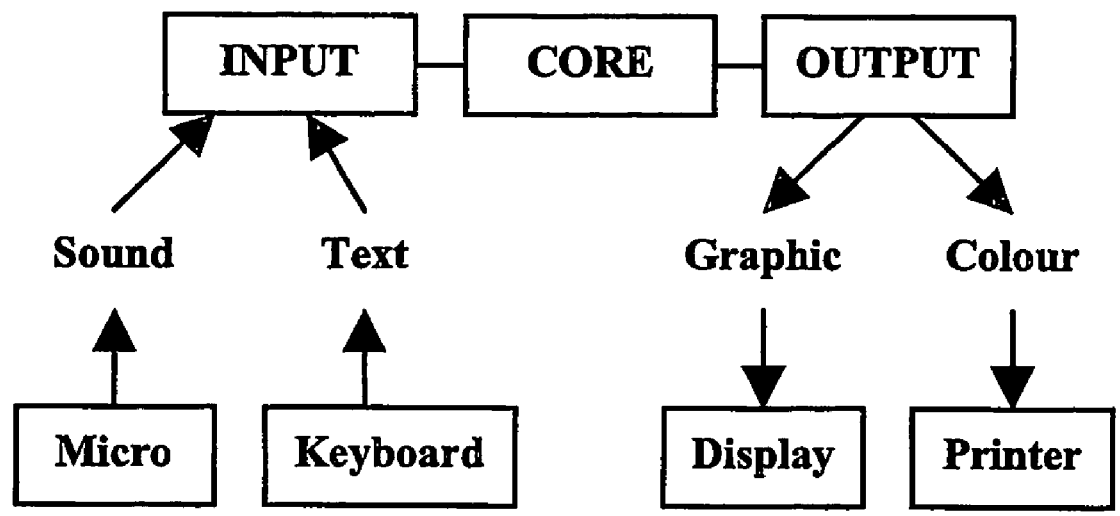
FIG. 4 is a diagram showing a PAN application structure.

The PANM should be able to redirect an output stream from one device to the input stream of another one. For example the sound output stream from the PDA can be redirected to the earphone and the sound input redirected to the microphone. It must intercept the output stream addressed to a device at an output port, perform the necessary transformation and send it to another device on the PAN. An API (Application Programming Interface) should be defined D. Application/Service Input and Output Redirection The input and output redirection should also be done at the application/service level, i.e. one application can be redirected to one device while a second one to another device. However, this capability is more difficult since it depends on the feature of the operating system and may also require a new application structure as shown in FIG. 4. An application consists of three components: Core, Input and Output. The Core component contains the main logic of the application and should remain invariant. The Input and Output Components should be specified according to the services supported such as sound input, text input, graphic display, colour printing, etc. If a device offers a service matching the one required then it can be used for the application.

E. User Profile Management

The user and owner of the PAN should be reserved the right to define the following:

What devices are allowed to participate to his PAN when present within the PAN's coverage.

How the devices should be used at a particular location or at a particular time or according to a certain timetable.

How should the redirection between devices be

Which device should be internal and which one should be global and visible to the outside world.

Which applications and their settings

How should the applications should be distributed among the devices, i.e. how the three components should distributed among devices according to criteria as quality, price, battery level, etc.

In addition, the user must have the ability to alter, remove, and add device and applications at any time and anywhere. These hard requirements put quite a lot of challenge on the design of the User Profile structure and the architecture of the system around it.

F. Interface to the User

Since the user, as owner of the PAN, should be the one having the right to decide everything, there is a need for an application called PAN Control that offers interfaces allowing him/her to communicate and control the PAN Middleware. As other applications, the PAN Control should be also structured as Core, Input and Output and should support a variety of input and output services.

G. Interface to Applications and Services

With the apparition of the PAN, a brand new type of applications called PAN-based applications is born. This new type of applications will actively take advantage of the unique properties of the PAN: device dynamic and resource sharing. A typical example of PAN-based applications is an application, which focuses on the control of existing applications, their parallel execution, their flexible and dynamic composition, the distribution of their input and output. The PANM should provide an Application Programming Interface (API) allowing the application access to the PAN capabilities and functions. Such an API can be implemented in different technologies, e.g. Java, CORBA, XML Web service, etc.

H. Summary

Generally, to realize a Virtual Device on an isolated PAN with a unique Open device the PAN middleware must be installed and executed on this unique Open device.

Figure 5:
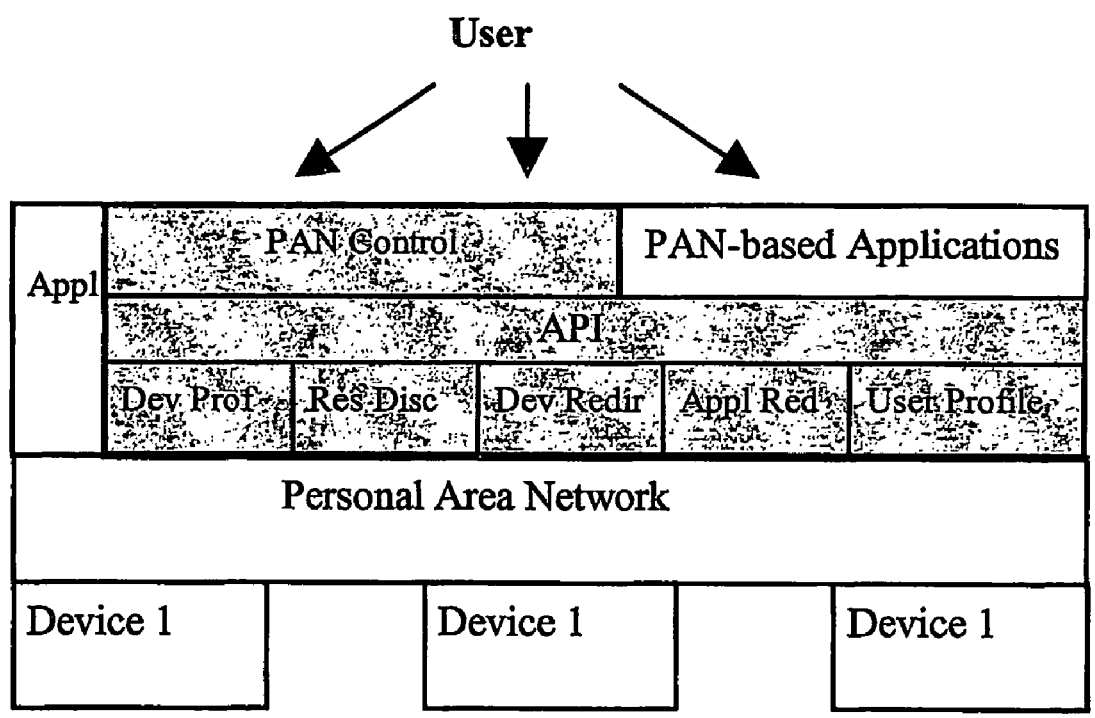
FIG. 5 is a diagram showing the organization of the Personal Area Network Middleware for a Virtual Device on a PAN with a unique Open Device.

As shown in FIG. 5 the necessary capabilities and functions in the PAN Middleware (PANM) in the case of an isolated PAN with unique Open Device are:

Device Profile
Resource Discovery
Device Redirection
Application Redirection
User Profile Management
PAN Control
PAN API This PAN configuration depends totally on the central device, the open device and will collapse when the open device disappears, is switched off or runs out of battery. Another disadvantage is the limitation of the resource sharing since most of devices are Closed and Primitive and hence impenetrable.

Virtual Device on Isolated Pan with Multiple Open Devices

Figure 6:
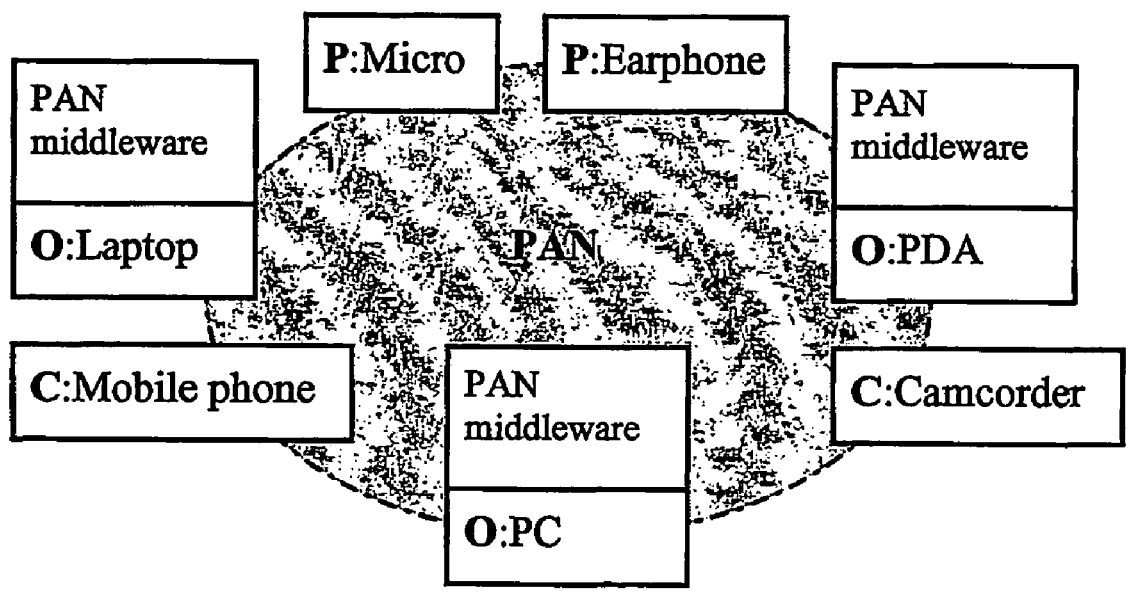
FIG. 6 is showing a Virtual Device on a PAN with multiple Open Devices.

In this PAN configuration, there are now multiple Open devices, multiple Closed devices and multiple Primitive devices. FIG. 6 shows a Virtual Device on a PAN with two Primitive devices: microphone and earphone, two Closed devices: Mobile phone and Camcorder, and three Open devices: PDA, Laptop and PC.

In such a PAN, in addition to the features identified for the previous case it is desirable to achieve better collaboration and more optimal resource sharing between the Open devices. The PANM as defined in the previous case can now be distributed among the Open devices.

We present now successively all the possible alternatives for the distribution of the PANM (PAN Middleware) and resource sharing on the Open devices.

A. Distributed Operating System

In this alternative, the PAN Middleware is a Distributed Operating System deployed on all the Open devices and coupling them tightly as one. Such an alternative demands the implementation of the Distributed OS on all the Open device types and with the rapid growth in type of mobile devices this could be difficult. Another disadvantage is that the device dynamic can create serious problem for the Distributed OS that requires much stability.

B. Distributed Computing

In this alternative, the PAN Middleware is a Distributed Computing Middleware, which hides the distribution and communications from the applications and application developers. In order to be able to support PAN, the traditional Distributed Computing Middleware must be extended with functionality to cope with the dynamic of devices. This alternative has an advantage compared to the previous in the sense that there are fewer operating systems and the number of Middleware implementations is lower. On the other, it is important to quantify the overhead introduced and to investigate whether it is acceptable for mobile devices with limited processing and storage capabilities and battery life.

C. XML Web Services

In this alternative, the PAN Middleware consists of the logic necessary to expose the capabilities and functions of each Open device as an XML (extensible Markup Language) Web services [6]. The other Open devices can hence invoke these Web services by using SOAP (Simple Object Access Protocol) [7]. With the Web service concept unlike the Distributed Computing the distribution is not hidden. Entities know that communicate with remote entities but communication is made simpler by the automatic generation of SOAP message. This alternative requires that a Web service platform is installed on each Open device offering Web service and this could create an overhead to the PAN. However, the devices are more loosely coupled in this alternative and it can cope better with device dynamic.

D. Application Distribution, Coordination and Control

In this alternative the PAN Middleware performs the distribution, coordination and control of applications based on the application structure: Core, Input and Output. The distribution of the input and output components is already taken care by the Application Redirection Function mentioned earlier. Concerning the Core, it could only be moved and resumed on compatible Open device, i.e. devices capable of supporting it. For example, an application Core written in Java can only be moved to a device having a Java Virtual Machine and not to a MS Windows device. To achieve the application migration, the mobile agent concept can be appropriate since an agent can stop the execution of an application, serialize it, transport it to another device, de-serialize and resume the execution.

E. Summary

Figure 7:
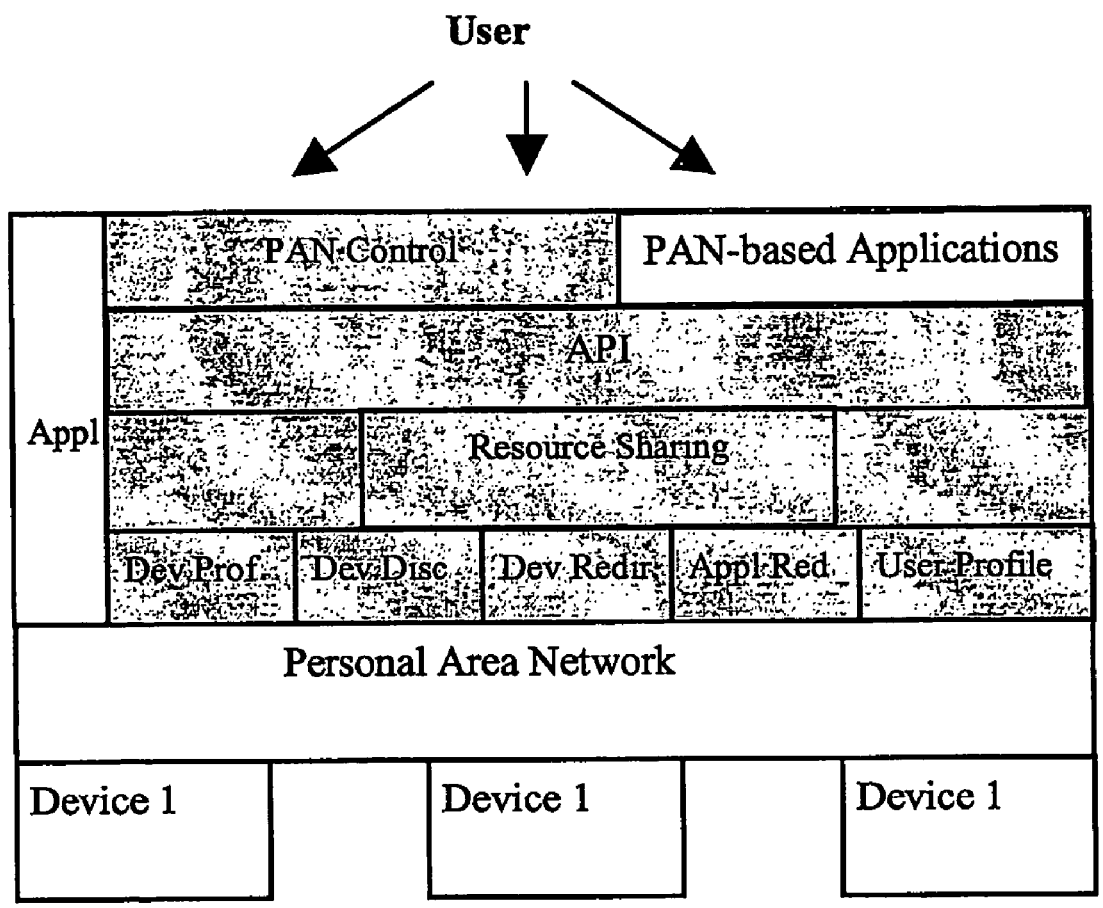
FIG. 7 is showing the Personal Area Network Middleware for a Virtual Device on a PAN with multiple Open Devices.

Generally, to realize a Virtual Device on an isolated PAN with a multiple Open devices the PAN middleware should be distributed among the Open devices. To achieve the distribution of the PANM and resource sharing between Open devices a new function is introduced in the PANM called Resource Sharing. The Resource Sharing can be realized by one or combination of the approaches: Distributed Operating System, Distributed Computing, XML Web Services or Application distribution, coordination and control. To achieve optimal resource usage a Resource Sharing function is required in the PANM as shown in FIG. 7. The necessary capabilities and functions in the PAN Middleware (PANM) in the case of an isolated PAN with multiple Open Devices are:

Device Profile

Resource Discovery

Device Redirection

Application Redirection

User Profile Management

Resource Sharing

PAN Control

PAN API

Virtual Device on Networked Pan without Open Device

In this configuration the Virtual Device does not have any open device but only either Primitive or Closed device. Usually as mentioned earlier, without an Open device, the Virtual Device will collapse but fortunately there is a way to remedy the situation if there is one device with network connection.

Figure 8:
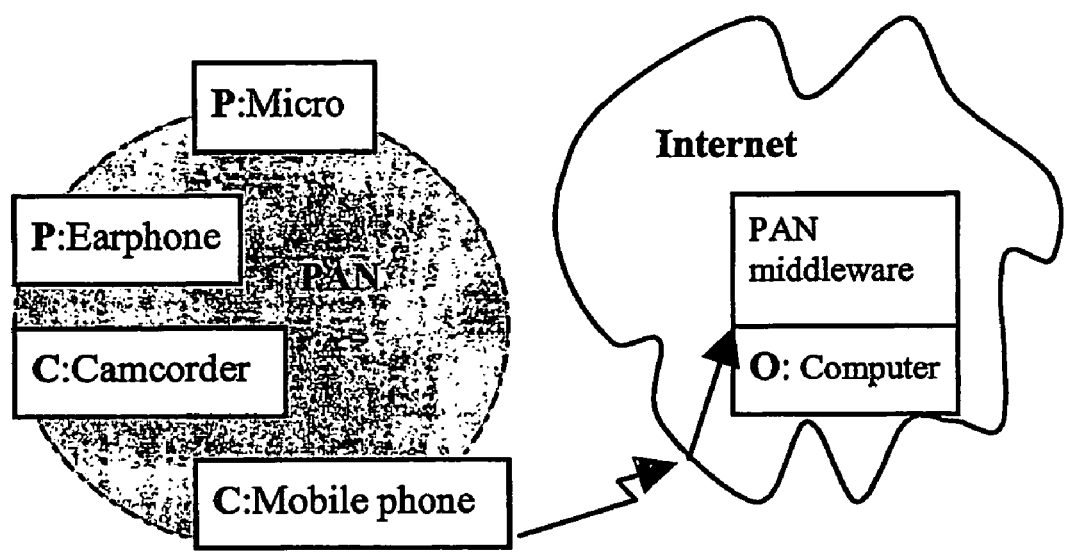
FIG. 8 is showing a networked PAN without any Open Device.

As shown in FIG. 8, the mobile phone allows communication with a Computer running PAN Middleware. In this case the PAN can function very well because it is logically equivalent to the configuration Isolated PAN with unique Open device if the Computer on the network is considered as a PAN device. This configuration is, however, very interesting since it opens for several relevant usage. Indeed, the network computer can be Home PC or the office workstation that the user always leave behind when traveling but it can still participate and give support to his PAN. This network computer can also be provisioned and managed by a Service Provider that offers PAN service to the users.

SUMMARY

Generally, it is possible to realize a Virtual Device on a networked PAN without any Open Device if the user has an open device on the network (Internet) running the PANM.

1.1.1. Virtual Device on Network Pan with Open Device

Figure 9:
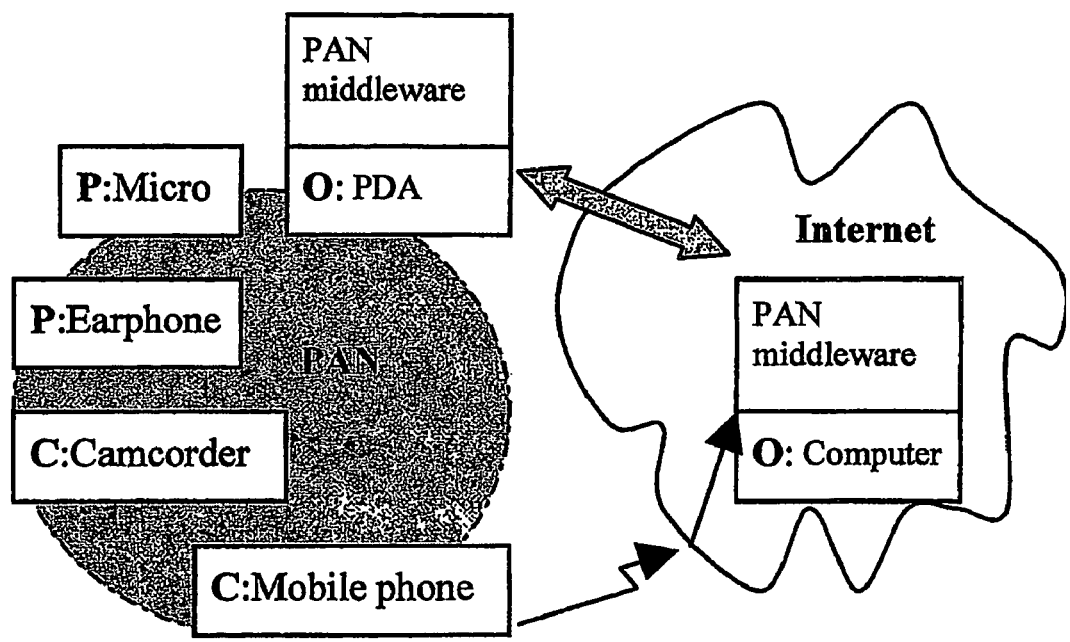
FIG. 9 shows a Virtual Device on a networked PAN with an Open Device.
Figure 10:
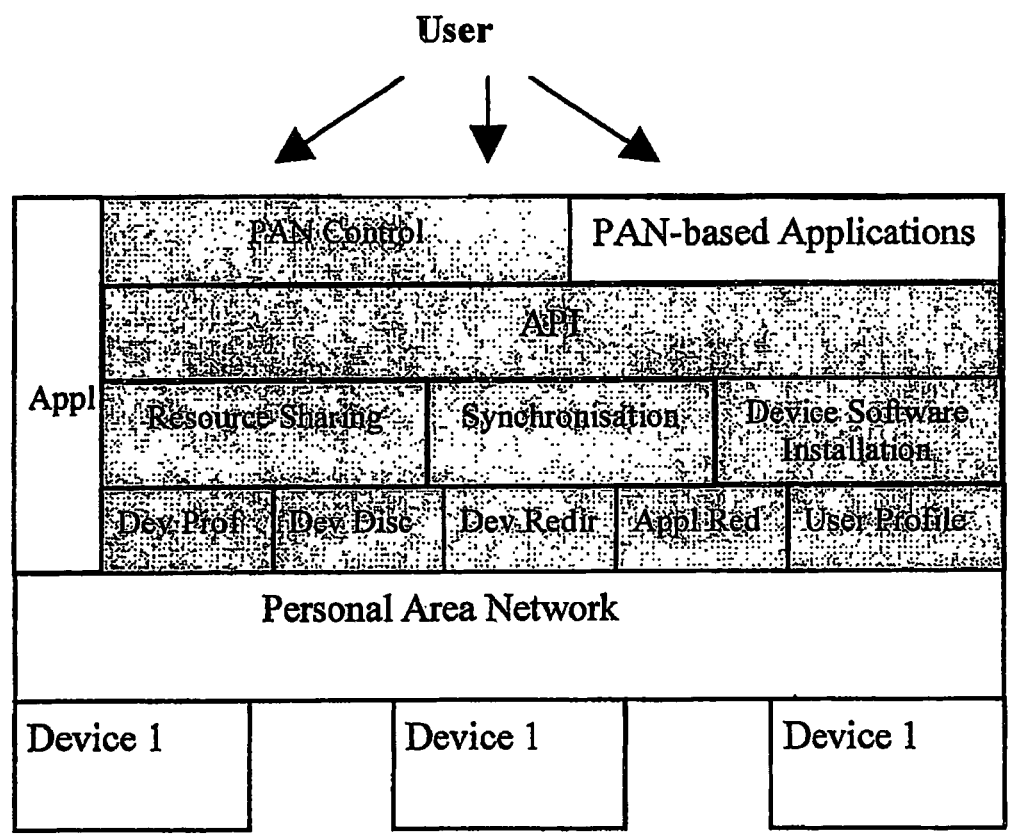
FIG. 10 shows the Personal Area Network Middleware for a Virtual Device on a networked PAN with an Open Device.

In this configuration, the PAN has all the device types: Open, Closed and Primitive but also those having network connection. This configuration is logically equivalent with the Isolated PAN with multiple Open devices. However, as shown in FIG. 9 in order to reduce the usage of the network connection, it is perhaps desirable not to have tight coupling between the PDA on the PAN and the network computer. The network computer in this case acts as a safe storage and a Synchronization function should be added in the PANM (PAN Middleware) as shown in FIG. 10. The synchronization function ensures the consistency of the Virtual Device data, settings and profiles.

It is also quite useful to include a Device Software Installation and Updating function that offer the possibility to search, select, download and install the appropriate software version for a device on the PAN. When the user wants to add a new device in his Virtual Device specific software, e.g. drivers, plug-ins, etc. may be required. The Device Software Installation and Updating function may carry out the necessary operation and allow seamless introduction of new devices to the Virtual Device.

SUMMARY

In a Virtual Device on a networked PAN with Open Device, the Open Devices both on the PAN and on the network (Internet) should run the PANM.

The necessary capabilities and functions in the PAN Middleware (PANM) in the case of a networked PAN with Open Device are:
- Device Profile
- Resource Discovery
- Device Redirection
- Application Redirection
- User Profile Management
- Resource Sharing
- Synchronization
- Device Software Installation
- PAN Control
- PAN API

REFERENCES

[1] Do, van Thanh, Jønvik Tore, Vanem Erik, Tran, Dao van & Audestad, J. A.: The Device Management Service, Proceedings of The IEEE Intelligent Network Workshop 2001 (IN2001), Boston, USA, ISBN 0-7803-7047-3, May 6-9, 2001.
[2] Vanem Erik, Tran, Dao van, Jønvik Tore & Do, van Thanh: Extending VHE with the Device Unifying Service, Proceedings of The IEEE International Conference on Communications ICC 2002, ISBN 0-7803-7400-2 (sofbound) ISBN 0-7803-7401-0 (CD-ROM), New York, USA, April 28-May 2, 2002.
[3] https://www.bluetooth.org/
[4] http://standards.ieee.org/getieee802/portfolio.html
[5] 3GPP TS 07.07 V7.7.0 (2001-12) Technical Specification Group Terminals; AT command set for GSM Mobile Equipment (ME) (Release 1998)
[6] "Executive Overview: Web Services", The Forrester Brief, Forrester Research Inc. October 2001
[7] "What are Web Services", DestiCorp Ltd., http://www.desticorp.com/focus_ws.html

The invention claimed is:

1. A system including a plurality of stationary and/or portable electronic devices, comprising:
   a first Open Device with an inner structure and a first Personal Area Network interface;
   at least one Primitive Device arranged to communicate with and to act as a pure slave to other devices;
   at least one Closed Device with a closed inner structure and a second Personal Area Network interface;
   said first Open Device and said at least one Closed Device being connected in a Personal Area Network;
   said first Open Device being arranged to discover and register any of said other devices present in said Personal Area Network,
   a Personal Area Network middleware installed in said first Open Device, and arranged to act as a Personal Area Network controller
   to store and maintain a device profile including device information on at least identity, type, capabilities and services offered by any Open Devices, Closed Devices or Primitive Devices available to said Personal Area Network,
   to redirect an output stream from one device to an input port on another device,
   to redirect an application to a specific device present in said Personal Area Network,
   to store and maintain a user profile including user information on at least which Open Devices, Closed Devices or Primitive Devices are members of said Personal Area Network, which Open Devices, Closed Devices or Primitive Devices are available for said Personal Area Network, redirection, which Open Devices, Closed Devices or Primitive Devices should be visible on an external network, distribution of services among Open Devices or Closed Devices present in said Personal Area Network, and distribution of resources among Open Devices or Closed Devices present in said Personal Area Network,
   to include a user interface enabling a user to control said Personal Area Network middleware, and
   to include an Application Programming Interface allowing applications access to capabilities and functions in said Personal Area Network middleware.

2. The system as claimed in claim 1, further comprising a second Open Device connected to said Personal Area Network.

3. The system as claimed in claim 1, characterized in that said Application Programming Interface is implemented as any of: Java, CORBA, or an XML Web service.

4. The system as claimed in claim 1, wherein at least one of said Open Devices or said Closed Devices is equipped with an external network interface connected to said external network.

5. The system as claimed in claim 4, further comprising a Personal Area Network server residing on said external network and arranged to store a backup copy of information stored in said Personal Area Network, and to synchronize said backup copy with said information.

6. The system as claimed in claim 5, wherein said first Open Device is arranged to periodically poll said Personal Area Network.

7. A system including a plurality of stationary and/or portable electronic devices, comprising:
   Open Devices each having an available inner structure and a first Personal Area Network interface;
   at least one Primitive Device arranged to communicate with other devices and to act as a pure slave to said other devices;
   at least one Closed Device with a closed inner structure and a second Personal Area Network interface;
   said Open Devices and said at least one Closed Device being connected in a Personal Area Network,
   said Open Devices each being arranged to act as a Personal Area Network controller, to discover and register any devices present in said Personal Area Network, and to invoke services running on other Open Devices;
   a Personal Area Network middleware installed on and distributed between said Open Devices, and arranged
   to store and maintain a device profile including device information on at least identity, type, capabilities and services offered by any Open Devices, Closed Devices or Primitive Devices available for said Personal Area Network,
   to redirect an output stream from one device to an input port on another device,
   to redirect an application to a specific device present in said Personal Area Network,
   to store and maintain a user profile including user information on at least which Open Devices, Closed Devices or Primitive Devices are members of said Personal Area Network, redirection, which Open Devices, Closed Devices or Primitive Devices should be visible on an external network, distribution of services among Open Devices or Closed Devices present in said Personal Area Network, and distribution of resources among Open Devices or Closed Devices present in said Personal Area Network, to include a user interface enabling a user to control said Personal Area Network middleware, and to include an Application Programming Interface allowing applications access to capabilities and functions in said Personal Area Network middleware.

8. The system as claimed in claim 7, wherein at least one of said Open Devices or said Closed Devices is equipped with an external network interface connected to said external network.

9. The system as claimed in claim 8, further comprising a Personal Area Network server residing on said external network, connected to said Personal Area Network, and arranged to store a backup copy of information stored in said Personal Area Network, and to synchronize said backup copy with said information.

10. The system as claimed in claim 9, wherein each Open Device is arranged to periodically poll said Personal Area Network.

11. The system as claimed in claim 7, further comprising a Web service platform installed on each Open Device for enabling said each Open Device to invoke Web services running on said other Open Devices.

12. The system as claimed in claim 7, characterized in that said Application Programming Interface is implemented as any of: Java, CORBA, or an XML Web service.

13. A system including a plurality of portable electronic devices, comprising:
   an Open Device with an available inner structure and a first Personal Area Network interface;
   at least one Primitive Device arranged to communicate with other devices and to act as a pure slave to said other devices;
   at least one Closed Device with a closed inner structure, a second Personal Area Network interface, and an external network interface;
   an external network to which said external network interface is connected;
   a Personal Area Network server residing on said external network,
   said Open Device, said at least one Closed Device and said Personal Area Network server being connected in a Personal Area Network,
   said Open Device being arranged to discover and register any of said other devices present in said Personal Area Network;
   a Personal Area Network middleware, installed on said Personal Area Network server, operating said Personal Area Network and arranged
   to store and maintain a device profile including device information on at least identity, type, capabilities and services offered by any Open Devices, Closed Devices or Primitive Devices available for said Personal Area Network,
   to redirect an output stream from one device to an input port on another device,
   to redirect an application to a specific device present in said Personal Area Network,
   to store and maintain a user profile including user information on at least which Open Devices, Closed Devices or Primitive Devices are members of said Personal Area Network, which Open Devices, Closed Devices or Primitive Devices are available for said Personal Area Network, redirection, which Open Devices, Closed Devices or Primitive Devices should be visible on said external network, distribution of services among Open Devices or Closed Devices present in said Personal Area Network, and distribution of resources among Open Devices or Closed Devices present in said Personal Area Network,
   to include a user interface enabling a user to control said Personal Area Network middleware, and
   to include an Application Programming Interface allowing applications access to capabilities and functions in said Personal Area Network middleware.

14. The system as claimed in claim 13, characterized in that said Application Programming Interface is implemented as any of: Java, CORBA, or an XML Web service.

15. A system including a plurality of portable electronic devices, comprising:
   at least one Closed Device with a closed inner structure, a Personal Area Network interface, and an external network interface;
   at least one Primitive Device arranged to communicate with and to act as a pure slave to said at least one Closed Device;
   a server in said external network on which is installed a Personal Area Network middleware, said server being arranged to communicate with said at least one Closed Device in order to act as a Personal Area Network controller, wherein said Personal Area Network middleware is arranged
   to store and maintain a device profile including device information on at least identity, type, capabilities and services offered by any Closed Devices or Primitive Devices available for said Personal Area Network,
   to redirect an output stream from one device to an input port on another device,
   to redirect an application to a specific device present in said Personal Area Network,
   to store and maintain a user profile including user information on at least which Closed Devices or Primitive Devices are members of said Personal Area Network, which Closed Devices or Primitive Devices are available for said Personal Area Network, redirection, which Closed Devices or Primitive Devices should be visible on said external network, distribution of services among Closed Devices present in said Personal Area Network, and distribution of resources among Closed Devices present in said Personal Area Network,
   to include a user interface enabling the user to control said Personal Area Network middleware, and
   to include an Application Programming Interface allowing applications access to capabilities and functions in said Personal Area Network middleware.

16. The system as claimed in claim 15, wherein said Personal Area Network server is arranged to periodically poll devices connected to said Personal Area Network.

17. The system as claimed in claim 15, characterized in that said Application Programming Interface is implemented as any of: Java, CORBA, or an XML Web service.

18. A system, comprising:
   at least one first device capable of transmitting a first output stream via a first communication interface;
   a second device comprising a second communication interface capable of receiving said first output stream via a connection local to the first and second devices, said second device and at least one third device forming a Personal Area Network, said second device being connectable to a further network external to the Personal Area Network and external to the connection local to the first and second devices;

a Personal Area Network middleware, executed by at least a fourth device, storing at least a user profile including redirection information for said at least one third device of the Personal Area Network;

the second device being arranged to intercept and redirect said first output stream to an input port of said at least one third device based on said redirection information; and the fourth device being in communication with the second device over the further network external to said first and third devices, and wherein redirection of said first output is performed via the fourth device communicating with the second device over the further network.

19. The system as claimed in claim 18, further comprising a user interface application enabling a user to control said Personal Area Network middleware and manage said redirection information.

20. The system as claimed in claim 18, wherein said Personal Area Network middleware is distributed among and executed by both said second device and said fourth device.

21. The system as claimed in claim 20, wherein user profile data and settings stored by said Personal Area Network middleware are synchronized between said second device and said fourth device.

22. The system as claimed in claim 20, wherein said Personal Area Network middleware is distributed using XML Web services.

23. The system as claimed in claim 18, further comprising at least one other second device, wherein said Personal Area Network middleware is distributed among said second devices.

24. The system as claimed in claim 23, wherein said Personal Area Network middleware is distributed using XML Web services.

25. The system as claimed in claim 18, wherein said first output stream is generated by a first application, said system further comprising a second application generating a second output stream, said second output stream being redirected by said Personal Area Network middleware to a third device other than that to which said first output stream is redirected.

26. The system as claimed in claim 18, wherein said first device and said third device are selected from communication devices, computing devices, peripheral devices, electronic devices or electronic appliances.

27. The system as claimed in claim 18, wherein at least one of said first devices and said third devices is arranged to communicate with and to act as a pure slave to other devices.

28. The system as claimed in claim 18, wherein said Personal Area Network middleware is additionally arranged to discover and register any of said first, second, and third devices present in said Personal Area Network and to store their presence in a device profile including device information on at least identity, type, capabilities and services offered by any of said first, second, or third devices.

29. The system as claimed in claim 18, wherein said user profile further comprises which of said first, second and third devices are members of said Personal Area Network.

30. The system as claimed in claim 29, wherein said user profile further comprises which of said first, second and third devices are available for said Personal Area Network.

31. The system as claimed in claim 18, wherein said user profile further comprises information regarding distribution of services and resources among said first, second and third devices present in said Personal Area Network.

32. The system as claimed in claim 18, wherein said Personal Area Network middleware is arranged to include an Application Programming Interface enabling application access to capabilities and functions in said Personal Area Network middleware.

33. The system as claimed in claim 32, wherein said Application Programming Interface is implemented as any of: Java, CORBA or an XML Web service.

34. A system, comprising:
at least one first device capable of transmitting a first output stream via a first communication interface;

a second device comprising a second communication interface capable of receiving said first output stream via a connection local to the first and second devices, said second device and at least one third device forming a Personal Area Network, said second device being connectable to a further network external to the Personal Area Network and external to the connection local to the first and second devices;

a Personal Area Network middleware, executed by at least said second device, storing at least a user profile including redirection information for said at least one third device of the Personal Area Network, and arranged to intercept and redirect said first output stream to an input port of said at least one third device based on said redirection information; and wherein said user profile further comprises means for presenting which of said first, second and third devices are visible on the further network.

35. The system as claimed in claim 34, further comprising a user interface application enabling a user to control said Personal Area Network middleware and manage said redirection information.

36. The system as claimed in claim 34, wherein said second device is on a network external to said first and third devices, and wherein redirection of said first output is performed via a fourth device in communication with the second device over a network interface.

37. The system as claimed in claim 36, wherein said Personal Area Network middleware is distributed among and executed by both said second device and said fourth device.

38. The system as claimed in claim 36, wherein user profile data and settings stored by said Personal Area Network middleware are synchronized between said second device and said fourth device.

39. The system as claimed in claim 36, wherein said Personal Area Network middleware is distributed using XML Web services.

40. The system as claimed in claim 34, further comprising at least one other second device, wherein said Personal Area Network middleware is distributed among said second devices.

41. The system as claimed in claim 40, wherein said Personal Area Network middleware is distributed using XML Web services.

42. The system as claimed in claim 34, wherein said first output stream is generated by a first application, said system further comprising a second application generating a second output stream, said second output stream being redirected by said Personal Area Network middleware to a third device other than that to which said first output stream is redirected.

43. The system as claimed in claim 34, wherein said first device and said third device are selected from communication devices, computing devices, peripheral devices, electronic devices or electronic appliances.

44. The system as claimed in claim 34, wherein at least one of said first devices and said third devices is arranged to communicate with and to act as a pure slave to other devices.

45. The system as claimed in claim 34, wherein said Personal Area Network middleware is additionally arranged to discover and register any of said first, second, and third devices present in said Personal Area Network and to store their presence in a device profile including device information on at least identity, type, capabilities and services offered by any of said first, second, or third devices.

46. The system as claimed in claim 34, wherein said user profile further comprises which of said first, second and third devices are members of said Personal Area Network.

47. The system as claimed in claim 45, wherein said user profile further comprises which of said first, second and third devices are available for said Personal Area Network.

48. The system as claimed in claim 34, wherein said user profile further comprises information regarding distribution of services and resources among said first, second and third devices present in said Personal Area Network.

49. The system as claimed in claim 34, wherein said Personal Area Network middleware is arranged to include an Application Programming Interface enabling application access to capabilities and functions in said Personal Area Network middleware.

50. The system as claimed in claim 49, wherein said Application Programming Interface is implemented as any of: Java, CORBA or an XML Web service.

* * * * *